(12) United States Patent
Heine et al.

(10) Patent No.: US 7,056,619 B2
(45) Date of Patent: Jun. 6, 2006

(54) CHARGEABLE BATTERY FOR MEDICAL DIAGNOSTIC INSTRUMENTS

(75) Inventors: Helmut M. Heine, Diessen (DE); Norbert Merkt, Herrsching-Breitbrunn (DE)

(73) Assignee: Heine Optotechnik GmbH & Co. KG, Herrsching (DE)

( * ) Notice: Subject to any disclaimer, the term of this patent is extended or adjusted under 35 U.S.C. 154(b) by 162 days.

(21) Appl. No.: 10/712,762

(22) Filed: Nov. 14, 2003

(65) Prior Publication Data

US 2004/0126627 A1    Jul. 1, 2004

(30) Foreign Application Priority Data

Dec. 27, 2002    (DE) .......................... 202 19 985 U

(51) Int. Cl.
*H01M 10/02*    (2006.01)

(52) U.S. Cl. ...................... 429/159; 429/153; 429/122; 600/197; 320/110

(58) Field of Classification Search .................. 429/99, 429/153, 157, 123, 159
See application file for complete search history.

(56) References Cited

U.S. PATENT DOCUMENTS 5,764,033 A * 6/1998 Tamai .......................... 320/132
2003/0234632 A1* 12/2003 Fang ........................... 320/110

* cited by examiner

*Primary Examiner*—Mark Ruthkosky
(74) *Attorney, Agent, or Firm*—Rothwell, Figg, Ernst & Manbeck

(57) ABSTRACT

A chargeable battery for medical diagnostic instruments includes a battery having an outer sheathing (2) in which an Li-ion cell (11) and a protective circuit are accommodated along with a charge/discharge module (12, 13).

2 Claims, 1 Drawing Sheet

CHARGEABLE BATTERY FOR MEDICAL DIAGNOSTIC INSTRUMENTS

FIELD OF THE INVENTION

The invention relates to a chargeable battery, in particular for medical diagnostic instruments.

DESCRIPTION OF THE BACKGROUND ART

In the case of such diagnostic instruments, a standard handle with exchangeable storage batteries serves for supplying power to diagnostic instruments which can be fitted onto the handle. The storage batteries are predominantly nickel-cadmium cells (NiCd) or nickel-metal hydride cells (NiMH). The known disadvantages of the NiCd cells—memory effect, self-discharging, low volume capacity, toxic constituents—are partly avoided by the more advanced NiMH cells. The memory effect and the self-discharging are considerably reduced; the volume capacity is higher and the cells can be disposed of without environmental impact. It is advantageous that NiMH cells have virtually the same voltage as NiCd cells (about 1.25 V). For both types of cell there are simple protective devices for limiting the charging or discharging current. Since the dimensions of NiMH cells are also similar to those of NiCd cells, NiMH batteries can be produced in the same dimensions as NiCd batteries. Therefore, it is readily possible to convert standard handles of NiCd cells to NiMH cells.

Lithium-ion storage batteries (Li-ion) have much better properties: no memory effect, very high volume capacity, no self-discharging, low weight. It is disadvantageous that Li-ion batteries have so far required a complex electronic protective circuit, which prevents overshooting or undershooting of specific voltages and limits the charging or discharging current, since otherwise there is the risk of the battery being destroyed or exploding.

The protective circuit is usually already installed in the battery by the battery manufacturer. It is additionally necessary to provide in the device for which an Li-ion storage battery is intended (for example cell phone, laptop) further electronic devices, which are generally referred to by the term charge/discharge management and adapt the properties of the battery to the properties of the device.

A special handle for medical diagnostic instruments to be used for Li-ion batteries in which the electronic charge/discharge management is installed has already been developed. The advantage of the advanced storage battery technology is offset here by the disadvantage that, when a user converts his diagnostic instruments to Li-ion batteries, he additionally has to obtain a new handle, although he already has a handle, or usually a number of handles, for NiCd or NiMH batteries.

SUMMARY OF THE INVENTION

The invention is therefore based on the object of developing a chargeable battery with an Li-ion storage battery for use with standard handles which is mechanically and electrically compatible with NiCd or NiMH batteries.

This object is achieved according to the invention by a chargeable battery for medical diagnostic instruments to be received in a standard handle, the battery having two opposed ends and an outer sheating in which an Li-ion cell and a protective circuit are accommodated along with a module comprising the charge/discharge management. In this case, the dimensions of the chargeable battery and the arrangement of its terminals correspond to those of conventional NiCd and NiMH batteries.

In a special design, the battery is configured in such a way that it has the same polarity at both ends. A battery designed in such a way can be inserted into a handle sleeve in both directions.

The module for the charge/discharge management is preferably designed in such a way that an external charging device can be controlled by it, in order for example to charge the battery with the highest possible current intensity in the shortest possible time and to switch off the charging current once charging has been completed.

The invention is in principle not restricted to the use of Li-ion cells. It can be adapted to newly developed cells of similar or further improved properties.

BRIEF DESCRIPTION OF THE DRAWINGS

The invention is explained below on the basis of the drawings, in which.

DETAILED DESCRIPTION OF THE INVENTION

Figure 1:
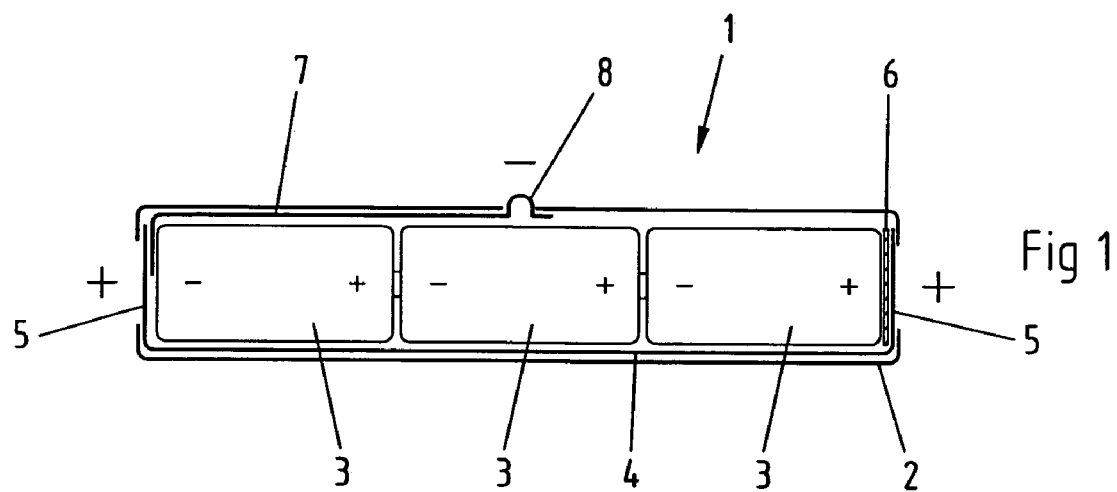
FIG. 1 shows a schematic cross section of a known chargeable battery means.

FIG. 1 shows a schematic cross section of a known chargeable battery 1, in which three NiCd cells 3 are spatially arranged one behind the other and electrically connected one behind other in an outer sheathing 2, for example comprising a shrink tube. The outer positive terminal of the series connection is connected via a positive lead 4 to the outside to two positive terminals 5 at the ends. Between the positive terminal of the series connection and the positive lead 4 there is an overload protection in the form of a conductor 6, which interrupts the current flow as the temperature increases, for example in the event of a short circuit. The negative terminal of the series connection is connected via a negative lead 7 to a negative terminal 8 arranged in the side surface of the chargeable battery. The necessary insulations between the electrically conductive parts of different polarity are not shown in the drawing for the sake of better clarity.

Figure 2:
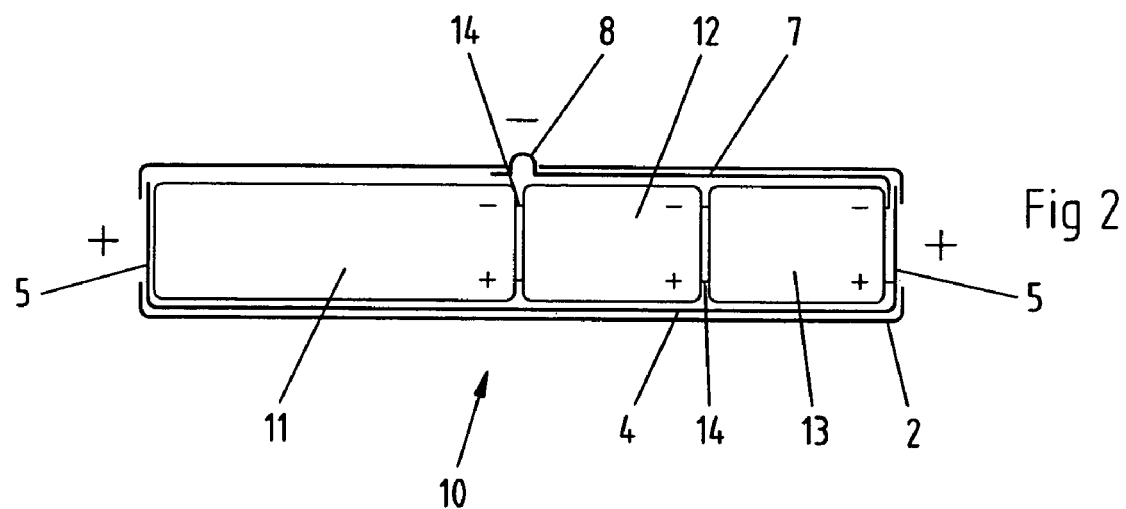
FIG. 2 shows the schematic cross section of a battery according to the invention.

FIG. 2 shows a chargeable battery 10 according to the invention of an externally identical construction, in which, instead of three cells 3, only one cell, that is an Li-ion cell 11, is provided. This takes up a considerably smaller volume than is the case with the known battery according to FIG. 1. In the remaining volume of this arrangement, a protective circuit 12 and a module 13 for the charge/discharge management are accommodated. In the case of the Li-ion cell 11 shown here, the positive and negative terminals are not accommodated on the end faces opposite from one another but together on one end face (Li-ion cells in which the positive and negative terminals are arranged at the opposite ends also exist). In a corresponding way, the Li-ion battery 11, the protective circuit 12 and the module 13 are connected to one another via connections which are shown here as pins 14. These connections may be plug-in, crimp, solder and other customary connections. If the Li-ion battery already has an integrated protective circuit, there is of course no need for the connections shown here.

The invention claimed is:

1. A chargeable device for medical diagnostic instruments, comprising a battery having two opposite ends and an outer sheathing in which an Li-ion cell, a protective circuit and a charge/discharge module are accommodated, wherein said battery has a same first polarity at both said opposite ends and a terminal of a second polarity opposite to said first polarity is arranged in a lateral surface of said battery.

2. A chargeable device for medical diagnostic instruments, comprising a battery having two opposite ends and an outer sheathing in which an Li-ion cell, a protective circuit and a charge/discharge module are accommodated, wherein said battery has a same first polarity at both said opposite ends and a terminal of a second polarity opposite to said first polarity is arranged in a lateral surface of said battery and said charge/discharge module controls an external charging device.

* * * * *